Jan. 31, 1961 K. S. RODAWAY 2,969,998
SEAL
Filed June 24, 1957
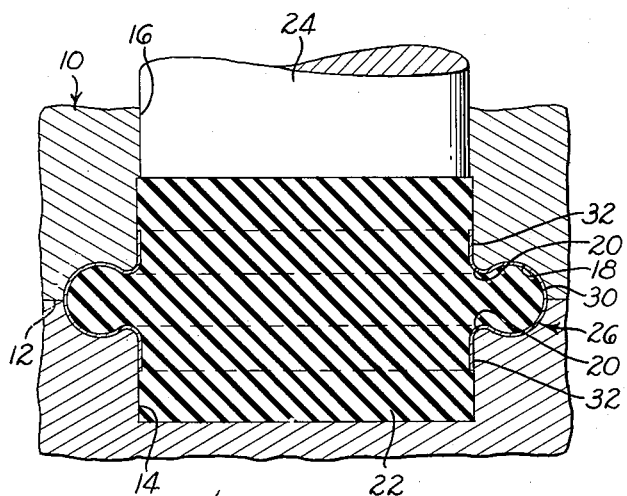
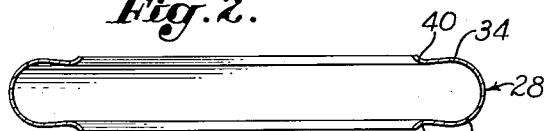
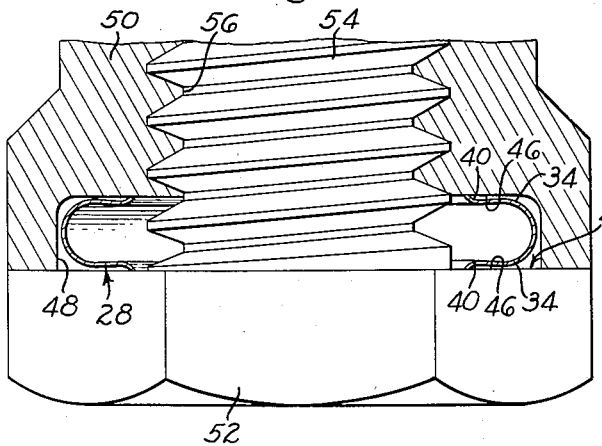
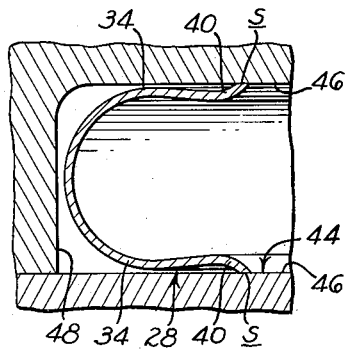
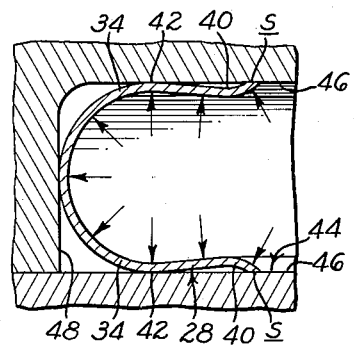
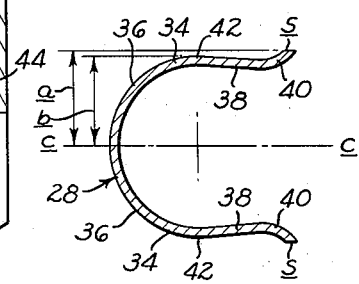
INVENTOR.
KEITH S. RODAWAY
BY HIS ATTORNEYS.
HARRIS, KIECH, FOSTER & HARRIS

United States Patent Office 2,969,998
Patented Jan. 31, 1961

2,969,998

SEAL

Keith S. Rodaway, Pacoima, Calif., assignor to General Metals Corporation (Adel Precision Products Division), Burbank, Calif., a corporation of California Filed June 24, 1957, Ser. No. 667,404

2 Claims. (Cl. 288—24)

The present invention relates generally to seals and, more particularly, to a seal capable of high temperature operation.

A primary object of the invention is to provide a self-energized metallic seal capable of operating at temperatures as high as 1000° F., or more, and at pressures ranging from substantially zero to as high as several thousand pounds per square inch.

More specifically, an object of the invention is to provide a metallic seal which is generally U-shaped in cross section and which includes spaced flanges terminating at their free ends or edges in plane, parallel sealing surfaces which face away from each other and which are spaced apart a distance slightly greater than the maximum external spacing of the flanges at a point between the free ends of the flanges and the base or bottom of the U.

Still more particularly, an important object of the invention is to provide an annular seal the cross-sectional configuration of which is substantially that of the Greek capital letter omega, the seal having axially spaced, radially and axially inwardly extending, annular flanges which terminate at their inner edges in axially spaced, radially inwardly and axially outwardly extending, annular lips which, in turn, terminate at their inner edges in axially spaced, axially outwardly facing, sealing surfaces in planes perpendicular to the axis of the seal.

Another object of the invention is to provide an omega-shaped seal of the foregoing nature wherein the flanges have a maximum external axial spacing radially outwardly of the sealing surfaces which is slightly less than the axial spacing of the sealing surfaces themselves.

A further object is to dispose the seal of the invention in an annular groove opposite sides of which are engaged by the sealing surfaces, respectively, the axial dimension of such groove being not greater than the axial spacing of the sealing surfaces and not less than the maximum external spacing of the flanges radially outwardly of the sealing surfaces.

Another object is to provide a seal wherein the axial spacing of the sealing surfaces is slightly greater than the axial dimension of the groove so that the seal is compressed slightly in the axial direction upon insertion into the groove to produce positive engagement between the sealing surfaces and the sides of the groove. This insures a fluid-tight seal even at pressures substantially equal to zero, which is an important feature.

Preferably, while the maximum external axial spacing of the flanges is no greater than the maximum axial dimension of the groove, as hereinbefore stated, the maximum axial dimension of the groove is slightly greater than the maximum external axial spacing of the flanges. The flanges, under such circumstances, are forced axially outwardly into engagement with the sides of the groove upon application of pressure to the interior of the seal.

However, it is an important object of the invention to make the difference between the maximum external axial spacing of the flanges and the axial spacing of the sealing surfaces sufficiently small that the sealing surfaces remain in planes perpendicular to the axis of the seal when both the sealing surfaces of the seal and the circles of maximum external axial spacing of the flanges of the seal are in engagement with the sides of the groove. In other words, the difference between the axial spacing of the sealing surfaces and the maximum external axial spacing of the flanges radially outwardly of the sealing surfaces is such that the sealing surfaces are not pivoted or rocked into positions out of parallelism with a plane perpendicular to the axis of the seal when the seal is disposed in the groove with both the sealing surfaces of the seal and the circles of maximum axial external spacing of the flanges of the seal in engagement with the sides of the groove. This insures maximum sealing effectiveness, which is an important feature.

The foregoing results are achieved by making the difference between the axial spacing of the sealing surfaces and the maximum external axial spacing of the flanges radially outwardly of the sealing surfaces not more than 0.010 inch, and preferably not more than 0.006 inch with tolerances of plus 0.000 inch and minus 0.002 inch. It has been found that the foregoing absolute maximum difference between the axial spacing of the sealing surfaces and the maximum external axial spacing of the flanges radially outwardly of the sealing surfaces of 0.010 inch applies throughout at least a range of outside seal diameters of from approximately one-half inch to one and one-quarter inches with no significant variations.

The manner in which the foregoing objects, advantages, features and results of the present invention are attained may best be understood by considering a detailed description of an exemplary embodiment of the invention in connection with the accompanying drawing, and various other objects, advantages, features and results of the invention will become evident to those skilled in the art in the light of such detailed description. Referring to the drawing:

Fig. 1 is a longitudinal sectional view illustrating a method of making one embodiment of the seal of the invention;

Fig. 2 is a longitudinal sectional view of a completed seal of the invention;

Fig. 3 is an enlarged sectional view illustrating the cross section of the seal of Fig. 2 in more detail;

Fig. 4 is a sectional view illustrating one possible installation of the seal of Fig. 2;

Fig. 5 is an enlarged, fragmentary sectional view duplicating a portion of Fig. 4 and showing the seal of the invention before application of fluid pressure thereto; and Fig. 6 is a view duplicating Fig. 5, but illustrating the seal of the invention after application of pressure thereto.

Referring first to Fig. 1 of the drawing, the numeral 10 designates a mold having a parting plane 12 and provided with a cylindrical cavity 14 perpendicular to and extending across the parting plane, a bore 16 coaxial with the cavity 14 communicating with one end of the latter. Bisected by the parting plane 12 and communicating with the cylindrical cavity 14 is an annular recess 18 of generally circular cross section, the recess having radiused edges 20 at its junction with the cavity 14.

As an initial step in forming the seal of the invention, which is to be described in more detail hereinafter, a cylindrical, tubular blank, not shown, is placed in the cavity 14 and an elastomeric male die 22, of rubber, or similar material, is placed within the blank. A plunger 24 disposed in the bore 16 compresses the elastomeric die 22 and forces the tubular, cylindrical blank into the recess 18, thereby producing an element 26 which represents a partially formed seal of the invention, the completely formed seal being shown in Figs. 2 to 6 and being designated by the numeral 28. The element 26 has an annular intermediate portion 30 conforming to the configuration of the annular recess 18, and has axially spaced, annular end portions 32 which are tubular and cylindrical, the foregoing description of the element 26 applying prior to removal thereof from the mold 10.

Upon removal of the element 26 from the mold 10, the end portions 32 of this element are removed adjacent the junctions of such portions with the intermediate portion 30. Removal of the element 26 from the mold 10 results in some spring back, and further spring back occurs upon removal of the end portions 32, whereby the resulting seal 28 is provided with the cross-sectional configuration illustrated in Figs. 2 and 3 of the drawing.

The foregoing operations result in a cross-sectional configuration for the seal 28 which may be described as generally U-shaped, or which may be more accurately described as substantially omega-shaped. More specifically, the seal 28 has a cross-sectional configuration substantially duplicating that of the Greek capital letter omega.

Considering the cross-sectional configuration of the seal 28 from another point of view, and referring particularly to Fig. 3 of the drawing, the seal includes two axially spaced, radially inwardly extending flanges 34 respectively disposed on opposite sides of and joined at a bisecting plane c—c perpendicular to the axis of the seal. The flanges 34 include sections 36 which are substantially quarter circles and include radially and axially inwardly extending, substantially linear sections 38. As will be apparent, the flanges 34 are formed by the circular section of the recess 18 in the mold 10.

The flanges 34 terminate at their inner edges in axially spaced, radially inwardly and axially outwardly extending, annular lips 40 which are convex inwardly with respect to both the radial and axial directions, these lips being formed by the radiused recess edges 20. The inner, free ends or edges of the lips 40 are located slightly farther from the bisecting plane c—c than the points, i.e., circles, 42 of maximum external spacing of the flanges 34 from the bisecting plane, the circles 42 being located substantially at the junctions of the sections 36 and 38 of the flanges 34.

The inner or free ends of the annular lips 40 are provided with sealing surfaces s which face axially away from each other and which are in planes absolutely perpendicular to the axis of the seal 28, the planes of the sealing surfaces s thus being parallel to the bisecting plane c—c. The sealing surfaces s are lapped to an extremely smooth finish free of any grooves or scratches extending transversely across the sealing surfaces, similar considerations being applicable to the sides of a groove in which the seal 28 is placed and which will be described hereinafter. Finishing the sealing surfaces s in this manner is essential to prevent leakage.

An extremely important feature of the present invention is that, for reasons which will become apparent, the axial spacing of each sealing surface s from the bisecting plane c—c, which axial spacing is represented by the dimensional arrow a, must be greater than, but only slightly greater than, the maximum external axial spacing of the corresponding flange 34 from the bisecting plane, the latter axial spacing being indicated by the dimensional arrow b. It has been found that the difference between the dimensions a and b must not exceed 0.005 inch, and preferably should not exceed 0.003 inch with tolerances of plus 0.000 inch and minus 0.001 inch, this applying for at least a range of outside diameters for the seal 28 of from approximately one-half inch to approximately one and one-quarter inches.

Figs. 4, 5 and 6 of the drawing illustrate an exemplary installation of the seal 28 in an annular groove 44 having axially spaced sides 46. In the particular construction illustrated, the groove 44 is formed by a counterbore 48 in a member 50 and by a bolt head 52 seated against the member 50 and closing the counterbore 48, the bolt head 52 being part of a bolt 54 threaded into a bore 56 coaxial with the counterbore 48. However, it will be understood that this particular installation of the seal 28 of the invention is illustrative only.

As previously suggested, an important relationship exists between the axial dimensions of the seal 28 and the axial dimension of the groove 44, i.e., the distance between the sides 46 thereof. First, the axial dimension of the groove 44 must not exceed the axial spacing of the sealing surfaces s, i.e., must not exceed twice the dimension a. Actually, the width of the groove 44 must be less than twice the dimension a so that the seal 28 is compressed axially upon insertion into the groove 44. Preferably, the width of the groove 44 is two or three thousandths of an inch less than the axial spacing of the sealing surfaces s. The axial compression of the seal 28 resulting from the foregoing relation between the axial dimension of the groove 44 and the axial spacing of the sealing surfaces s insures that the sealing surfaces engage the sides 46 of the groove with sufficient pressure to provide fluid-tight seals between the sealing surfaces s and the sides 46 of the groove even at fluid pressures within the seal of substantially zero, which is an important feature of the invention.

A second relationship between the axial groove dimension and the axial seal dimensions which is important is that the axial dimension of the groove 44 must be at least equal to the maximum external spacing of the flanges 34, i.e., at least equal to twice the dimension b, and is preferably equal to two or three thousandths of an inch more than twice the axial dimension b. This insures against pulling the sealing surfaces s away from the sides 46 of the groove 44 when the seal is installed in the groove, which is another important feature of the invention.

As will be apparent from Fig. 6 of the drawing, when fluid pressure is applied to the interior of the seal 28, the circles 42 of maximum external axial spacing of the flanges 34 respectively engage the sides 46 of the groove, and the circular junction of the flanges 34 may engage the peripheral or base wall of the groove, whereby the seal is firmly keyed in place in the groove to keep the sealing surfaces s from rotating or pivoting relative to the sides 46 of the groove. The importance of holding the difference between the dimensions a and b to a maximum of 0.005 inch will now be apparent. If any greater difference between these dimensions were utilized, the flanges 34 of the seal 28 would move axially, before engaging the sides 46 of the groove 44, distances sufficient to cause the sealing surfaces s to pivot or rock relative to the sides of the groove with the result that there would only be line contact, instead of surface contact, between the sealing surfaces and the groove sides. Thus, the present invention, by limiting the differences between the dimensions a and b to a maximum of 0.005 inch, insures that the sealing surfaces s remain in planes absolutely perpendicular to the axis of the seal when the seal is "inflated" into engagement with the walls of the groove by fluid pressure applied internally thereof. Consequently, maximum sealing effectiveness is maintained, which is an important feature of the invention.

Thus, the specific seal cross-sectional configuration disclosed, the specific relationship between the dimensions a and b disclosed, the specific relationship disclosed between the dimension a and the width of the groove 44, and the specific relationship disclosed between the dimension b and the width of the groove, all cooperate to provide a seal which is effective throughout a pressure range of from substantially zero to several thousand pounds per square inch, the metallic nature of the seal permitting operation at very high temperatures throughout such pressure range.

Although an exemplary embodiment of the invention has been disclosed herein for purposes of illustration, it will be understood that various minor changes, modifications and substitutions may be disclosed therein without departing from the spirit of the invention as defined by the claims which follow.

I claim:

1. A flexible and resilient annular seal of generally U-shaped cross section and of uniform thickness in cross section, said seal having axially spaced, radially extending, annular flanges which terminate in axially spaced, axially outwardly extending, annular lips which, in turn, terminate in axially spaced, axially outwardly facing, annular sealing surfaces in parallel planes perpendicular to the axis of said seal when said seal is unstressed, said flanges having a maximum external axial spacing in annular zones spaced radially from said sealing surfaces which is less than the axial spacing of said sealing surfaces by not more than 0.010 inch when said seal is unstressed, whereby when said seal is subjected to internal pressure between axially spaced, parallel annular walls the axial spacing of which is not greater than said axial spacing of said sealing surfaces and not less than said maximum external axial spacing of said flanges, said sealing surfaces and said annular zones engage said annular walls to provide engagement between said seal and said annular walls in four annular areas and, at the same time, said sealing surfaces retain the parallel relation therebetween which obtains when said seal is unstressed.

2. A flexible and resilient seal having the cross sectional configuration shown in Fig. 3 of the drawing, wherein the line $c$—$c$ denotes a plane bisecting the seal cross section, the lines $s$ denote sealing surfaces in planes parallel to the plane $c$—$c$ when the seal is unstressed, and the arrows $a$ and $b$ denote dimensions differing by not more than 0.005 inch when the seal is unstressed, the dimension denoted by the arrow $b$ being not greater than the dimension denoted by the arrow $a$ when the seal is unstressed, whereby when the seal is subjected to internal pressure between axially spaced, parallel walls the axial spacing of which is not greater than twice the dimension denoted by the arrow $a$ and not less than twice the dimension denoted by the arrow $b$, the seal engages said walls in four areas and, at the same time, the sealing surfaces $s$ retain the parallel relation therebetween which obtains when the seal is unstressed.

References Cited in the file of this patent

UNITED STATES PATENTS

| | | |
|---|---|---|
| 2,060,374 | Huhn | Nov. 10, 1936 |
| 2,512,883 | Warren | June 27, 1950 |

FOREIGN PATENTS

| | | |
|---|---|---|
| 711,125 | France | Sept. 4, 1931 |
| 727,075 | France | Mar. 15, 1932 |
| 614,140 | Germany | June 3, 1935 |
| 724,810 | Great Britain | Feb. 23, 1955 |